United States Patent
Bai et al.

(10) Patent No.: US 12,524,958 B2
(45) Date of Patent: Jan. 13, 2026

(54) OPEN VOCABULARY 3D SCENE PROCESSING

(71) Applicants: Lemon Inc., Grand Cayman (KY); Beijing Youzhuju Network Technology Co., Ltd., Beijing (CN)

(72) Inventors: Song Bai, Singapore (SG); Runyu Ding, Beijing (CN); Jihan Yang, Hong Kong (CN); Chuhui Xue, Singapore (SG); Wenqing Zhang, Singapore (SG); Xiaojuan Qi, Hong Kong (CN)

(73) Assignees: LEMON INC., Grand Cayman (KY); BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 70 days.

(21) Appl. No.: 18/183,869

(22) Filed: Mar. 14, 2023

(65) Prior Publication Data
US 2023/0290051 A1 Sep. 14, 2023

(51) Int. Cl.
*G06T 17/00* (2006.01)
*G06T 7/70* (2017.01)
(Continued)

(52) U.S. Cl.
CPC ............... *G06T 17/00* (2013.01); *G06T 7/70* (2017.01); *G06V 10/44* (2022.01); *G06V 10/764* (2022.01); *G06V 20/70* (2022.01); *G06V 2201/07* (2022.01)

(58) Field of Classification Search
CPC .......... G06T 17/00; G06T 7/70; G06V 10/44; G06V 10/764; G06V 20/70; G06V 2201/07; G06V 20/64
See application file for complete search history.

(56) References Cited

U.S. PATENT DOCUMENTS 11,568,576 B1 * 1/2023 Martinez ................... G06T 7/11
2010/0214284 A1 * 8/2010 Rieffel ..................... G06T 17/00
382/154

(Continued)

FOREIGN PATENT DOCUMENTS

CN 115512175 A 12/2022
CN 115545089 A 12/2022

OTHER PUBLICATIONS

Zhang et al., "PointCLIP: Point Cloud Understanding by CLIP," arXiv: 2112.02413v1, Dec. 4, 2021, 13 pages.

*Primary Examiner* — Kee M Tung
*Assistant Examiner* — Khoa Vu
(74) *Attorney, Agent, or Firm* — Astute IP Law Group

(57) ABSTRACT

A method is proposed for detecting an object in a 3D scene, including obtaining a detecting model that describes an association relationship between a plurality of base classes of a plurality of objects and 3D data of the plurality of objects. A plurality of open classes of a plurality of candidate objects to be detected in a 3D scene are received, the plurality of open classes comprise the plurality of base classes and at least one novel class not in the plurality of base classes. A 3D portion is detected in 3D data of the 3D scene based on the detecting model and the plurality of open classes, the 3D portion corresponds to a target candidate object in the plurality of candidate objects. With this method, objects that belong to a novel class, not annotated in training data of the detecting model, may be detected from the 3D data.

18 Claims, 6 Drawing Sheets

(51) Int. Cl.
*G06V 10/44* (2022.01)
*G06V 10/764* (2022.01)
*G06V 20/70* (2022.01)

(56) References Cited

U.S. PATENT DOCUMENTS

| | | | |
|---|---|---|---|
| 2015/0294193 A1* | 10/2015 | Tate | G06F 18/22 |
| | | | 382/159 |
| 2019/0147221 A1* | 5/2019 | Grabner | G06T 7/75 |
| | | | 382/103 |
| 2021/0279852 A1* | 9/2021 | Jakka | G06F 3/0484 |
| 2023/0059007 A1* | 2/2023 | Agrawal | G06V 10/764 |
| 2023/0146134 A1* | 5/2023 | Selviah | G06V 20/653 |
| | | | 345/419 |

* cited by examiner

Fig.7

| Method | $C^N$ prior | ScanNet B15/N4 hIoU | mIoU$^S$ | mIoU$^N$ | B12/N7 hIoU | mIoU$^S$ | mIoU$^N$ | B10/N9 hIoU | mIoU$^S$ | mIoU$^N$ | S3DIS B8/N4 hIoU | mIoU$^S$ | mIoU$^N$ | B6/N6 hIoU | mIoU$^S$ | mIoU$^N$ |
|---|---|---|---|---|---|---|---|---|---|---|---|---|---|---|---|---|
| LSeg-3D | ✗ | 00.0 | 64.4 | 00.0 | 00.9 | 55.7 | 00.1 | 00.9 | 68.4 | 00.9 | 00.1 | 49.0 | 00.1 | 00.0 | 30.1 | 00.0 |
| 3DGenZ | ✓ | 20.6 | 56.0 | 12.6 | 19.8 | 35.5 | 13.3 | 12.0 | 63.6 | 06.6 | 08.8 | 50.3 | 04.8 | 09.4 | 20.3 | 06.1 |
| 3DTZSL | ✓ | 10.5 | 36.7 | 06.1 | 03.8 | 36.6 | 02.0 | 07.8 | 55.5 | 04.2 | 08.4 | 43.1 | 04.7 | 03.5 | 28.2 | 01.9 |
| Ours (w/o Cap.) | ✗ | 39.7 | 28.0 | 28.0 | 24.5 | 70.0 | 14.8 | 25.7 | 75.6 | 15.5 | 13.0 | 58.0 | 07.4 | 12.2 | 54.5 | 06.8 |
| Ours | ✗ | 65.3 | 68.3 | 62.4 | 55.3 | 69.5 | 45.9 | 53.1 | 76.2 | 40.8 | 34.6 | 59.0 | 24.5 | 38.5 | 55.5 | 29.4 |
| Ours (w/ self-train) | ✓ | 70.3 | 68.9 | 71.7 | 61.1 | 70.4 | 54.0 | 59.2 | 76.9 | 48.2 | 36.1 | 59.7 | 26.0 | 46.7 | 58.9 | 38.7 |
| Fully-Sup. | ✓ | 73.3 | 68.4 | 79.1 | 70.6 | 70.0 | 71.8 | 69.9 | 75.8 | 64.9 | 67.5 | 61.4 | 75.0 | 65.4 | 59.9 | 72.0 |

710 TABLE

Fig.8

| Method | $C^N$ prior | ScanNet B13/N4 hAP$_{50}$ | mAP$_{50}^S$ | mAP$_{50}^N$ | B10/N7 hAP$_{50}$ | mAP$_{50}^S$ | mAP$_{50}^N$ | B8/N9 hAP$_{50}$ | mAP$_{50}^S$ | mAP$_{50}^N$ | S3DIS B8/N4 hAP$_{50}$ | mAP$_{50}^S$ | mAP$_{50}^N$ | B6/N6 hAP$_{50}$ | mAP$_{50}^S$ | mAP$_{50}^N$ |
|---|---|---|---|---|---|---|---|---|---|---|---|---|---|---|---|---|
| LSeg-3D | ✗ | 05.1 | 57.9 | 02.6 | 02.0 | 50.7 | 01.0 | 02.4 | 59.4 | 01.2 | 00.5 | 58.3 | 00.3 | 01.1 | 41.4 | 00.5 |
| Ours (w/o Cap.) | ✗ | 21.0 | 59.6 | 13.6 | 11.1 | 56.2 | 06.2 | 15.9 | 63.2 | 09.1 | 01.8 | 59.3 | 00.9 | 01.3 | 49.2 | 01.2 |
| Ours | ✗ | 55.5 | 58.5 | 52.9 | 31.2 | 54.6 | 21.9 | 35.9 | 63.1 | 25.1 | 15.0 | 59.0 | 08.6 | 16.0 | 46.9 | 09.8 |
| Ours (w/ self-train) | ✓ | 58.6 | 58.0 | 59.2 | 41.4 | 56.9 | 32.6 | 42.1 | 61.1 | 32.1 | 26.7 | 60.3 | 17.2 | 23.4 | 45.6 | 15.8 |
| Fully-Sup. | ✓ | 64.5 | 59.4 | 70.5 | 62.5 | 57.6 | 62.0 | 62.0 | 65.1 | 62.0 | 57.6 | 60.8 | 54.6 | 57.4 | 50.0 | 67.5 |

810 TABLE

900

| ScanNet partition | S3DIS Semantic (mIoU) | | S3DIS Instance (mAP$_{50}$) | |
|---|---|---|---|---|
| | LSeg-3D | Ours | LSeg-3D | Ours |
| B19/N0 | 42.5 | 50.2 (+7.7) | 37.5 | 43.6 (+6.1) |
| B15/N4 | 30.2 | 48.5 (+18.3) | 31.2 | 40.7 (+9.5) |
| B12/N7 | 26.1 | 38.3 (+12.2) | 28.2 | 35.1 (+6.9) |
| B10/N9 | 34.5 | 48.1 (+13.6) | 33.8 | 38.8 (+5.0) |

910 TABLE

1010 TABLE

| Components | | | | mIoU / mIoU$^B$ / mIoU$^N$ | hAP$_{50}$ / mAP$_{50}^B$ / mAP$_{50}^N$ |
|---|---|---|---|---|---|
| Binary | Cap$^S$ | Cap$^T$ | Cap$^V$ | | |
| | | | | 00.0 / 64.4 / 00.0 | 05.1 / 57.9 / 02.6 |
| ✓ | | | | 39.8 / 68.5 / 28.1 | 21.0 / 59.6 / 12.8 |
| ✓ | ✓ | | | 54.6 / 67.9 / 45.7 | 52.8 / 57.8 / 36.6 |
| ✓ | | ✓ | | 61.3 / 68.5 / 55.5 | 55.9 / 58.9 / 53.3 |
| ✓ | | | ✓ | 63.6 / 67.8 / 60.0 | 56.6 / 59.0 / 54.4 |
| ✓ | ✓ | ✓ | | 61.9 / 68.1 / 56.8 | 54.9 / 59.5 / 51.0 |
| ✓ | | ✓ | ✓ | 65.3 / 68.3 / 62.4 | 55.5 / 58.5 / 52.9 |
| ✓ | ✓ | ✓ | ✓ | 64.6 / 69.0 / 60.8 | 54.5 / 58.2 / 51.4 |

Fig.10

OPEN VOCABULARY 3D SCENE PROCESSING

FIELD

The present disclosure generally relates to three-dimensional (3D) scene processing, and more specifically, to methods, devices, and computer program products for 3D scene processing based on an open vocabulary for objects that are to be detected in the 3D scene.

BACKGROUND

Nowadays, 3D scene processing becomes popular in various fields. For example, 3D scene understanding aims to detect (for example, recognize and/or localize) object(s) in the 3D scene. Due to annotated training data related to 3D scene is very limited, only a limited number of objects in a close vocabulary are annotated in the training data, therefor processing models trained by the training data cannot effectively detect object belonging to novel classes beyond the close vocabulary. At this point, how to detect the objects in an open vocabulary in an effective way becomes a hot focus.

SUMMARY

In a first aspect of the present disclosure, there is provided a method for detecting an object in a 3D scene. In the method, a detecting model is obtained, here the detecting model describes an association relationship between a plurality of base classes of a plurality of objects and 3D data of the plurality of objects. A plurality of open classes of a plurality of candidate objects are that are to be detected in a 3D scene are received, here the plurality of open classes comprises the plurality of base classes and at least one novel class that is not comprised in the plurality of base classes. A 3D portion is detected in 3D data of the 3D scene based on the detecting model and the plurality of open classes, the 3D portion here corresponds to a target candidate object in the plurality of candidate objects, and a class of the target candidate object is comprised in the plurality of open classes.

In a second aspect of the present disclosure, there is provided an electronic device. The electronic device comprises: a computer processor coupled to a computer-readable memory unit, the memory unit comprising instructions that when executed by the computer processor implements a method according to the first aspect of the present disclosure.

In a third aspect of the present disclosure, there is provided a computer program product, the computer program product comprising a computer readable storage medium having program instructions embodied therewith, the program instructions executable by an electronic device to cause the electronic device to perform a method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

Through the more detailed description of some implementations of the present disclosure in the accompanying drawings, the above and other objects, features, and advantages of the present disclosure will become more apparent, wherein the same reference generally refers to the same components in the implementations of the present disclosure.

FIG. 7 illustrates an example diagram for a comparison between multiple detecting results according to implementations of the present disclosure;

FIG. 8 illustrates an example diagram for a comparison between multiple detecting results according to implementations of the present disclosure;

FIG. 9 illustrates an example diagram for a comparison between multiple detecting results according to implementations of the present disclosure;

FIG. 10 illustrates an example diagram for a comparison between multiple detecting results according to implementations of the present disclosure;

FIG. 14 illustrates an example flowchart of a method for detecting an object in a 3D scene based on an open vocabulary according to implementations of the present disclosure; and FIG. 15 illustrates a block diagram of a computing device in which various implementations of the present disclosure can be implemented.

DETAILED DESCRIPTION

Figure 1:
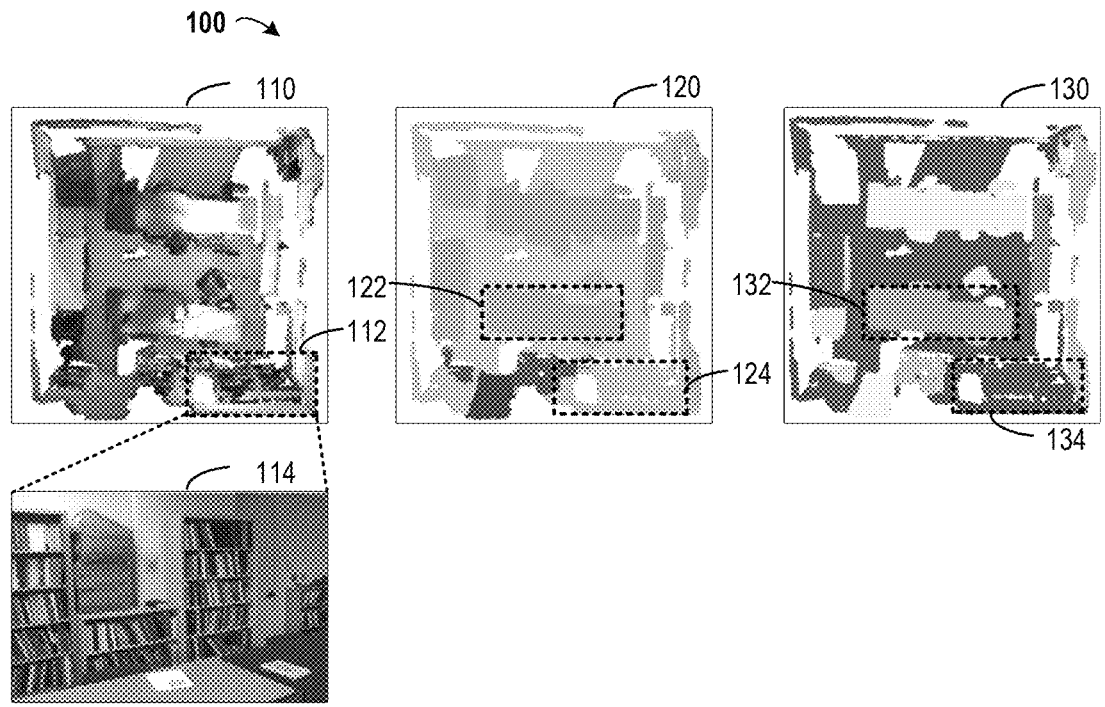
FIG. 1 illustrates an example environment for detecting an object in a 3D scene by a close vocabulary detecting model according to the machine learning technique.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one implementation," "an implementation," "an example implementation," and the like indicate that the implementation described may include a particular feature, structure, or characteristic, but it is not necessary that every implementation includes the particular feature, structure, or characteristic. Moreover, such phrases are not necessarily referring to the same implementation. Further, when a particular feature, structure, or characteristic is described in connection with an example implementation, it is submitted that it is within the knowledge of one skilled in the art to affect such feature, structure, or characteristic in connection with other implementations whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example implementations. As used herein, the term "and/or" includes any and all combinations of one or more of the listed terms.

The terminology used herein is for the purpose of describing particular implementations only and is not intended to be limiting of example implementations. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below. In the following description and claims, unless defined otherwise, all technical and scientific terms used herein have the same meaning as commonly understood by one of ordinary skills in the art to which this disclosure belongs.

It may be understood that data involved in the present technical solution (including but not limited to the data itself, the acquisition or use of the data) should comply with requirements of corresponding laws and regulations and relevant rules.

It may be understood that, before using the technical solutions disclosed in various implementation of the present disclosure, the user should be informed of the type, scope of use, and use scenario of the personal information involved in the present disclosure in an appropriate manner in accordance with relevant laws and regulations, and the user's authorization should be obtained.

For example, in response to receiving an active request from the user, prompt information is sent to the user to explicitly inform the user that the requested operation will need to acquire and use the user's personal information. Therefore, the user may independently choose, according to the prompt information, whether to provide the personal information to software or hardware such as electronic devices, applications, servers, or storage media that perform operations of the technical solutions of the present disclosure.

As an optional but non-limiting implementation, in response to receiving an active request from the user, the way of sending prompt information to the user, for example, may include a pop-up window, and the prompt information may be presented in the form of text in the pop-up window. In addition, the pop-up window may also carry a selection control for the user to choose "agree" or "disagree" to provide the personal information to the electronic device.

It may be understood that the above process of notifying and obtaining the user authorization is only illustrative and does not limit the implementation of the present disclosure. Other methods that satisfy relevant laws and regulations are also applicable to the implementation of the present disclosure.

Nowadays, 3D scene processing becomes popular in various fields, and objects may be detected in various 3D scene. For example, in an indoor monitoring environment, furniture such as tables, chairs, and the like may be detected from 3D data (such as point cloud data) of the indoor environment. In another example, in a traffic monitoring environment, vehicles and pedestrians may be detected from 3D data of the traffic environment. Due to annotated training data related to 3D scene is very limited and only a small number of objects in a close vocabulary are annotated in the training data, processing models trained by the annotated training data cannot effectively detect object belonging to novel classes beyond the close vocabulary.

For the purpose of description, the following paragraphs will provide more details by taking an indoor environment as an example of the 3D scene. FIG. 1 illustrates an example environment 100 for detecting an object in a 3D scene by a close vocabulary detecting model according to the machine learning technique. As shown in FIG. 1, 3D data 110 represents the scanned 3D data of an indoor 3D scene. Here, the 3D scene includes multiple objects that are classified into various classes. A detecting model may be trained by the training data, where only some classes in a close vocabulary (referred to as base classes) of the objects are annotated in the training data, and other classes (referred to as novel classes) of objects are not annotated in the training data. In the 3D data 110, the objects relate to base classes such as a wall, a table, a chair, a cabinet, and the like. Further, the 3D data 110 also include a novel class such as a bookshelf 112 (as shown by an image 114).

Generally, most detecting model are trained by training data with limited annotated data in a close vocabulary. For example, if the close vocabulary includes only a wall, a table, a chair, and a cabinet, then the trained detecting model cannot detect an unknown class "bookshelf" even if a bookshelf exists in the 3D scene. A result 120 shows a semantic result for detecting objects in the 3D data 110 based on a close vocabulary, where different colors represent different semantic classes of the objects, respectively. In the result 120, an object 122 is correctly detected as "a table" due to the detecting model has the knowledge of "table" from the annotated data. However, an object 124 (which is actually a bookshelf) is wrongly detected as "a wall" due to the detecting model has no knowledge of "bookshelf" from the annotated data. Similarly, a result 130 shows a localization result for detecting objects in the 3D data 110, where a 3D mask 132 correctly indicates the table but a 3D mask 134 wrongly indicates a cabinet.

As shown in FIG. 1, models trained on a human-annotated dataset are only capable of understanding semantic classes in that dataset, which is called as a closet-set prediction. As a result, these models fail to recognize unseen classes in the open world. This largely restricts their applicability in real world scenarios with unbounded classes. Besides, heavy annotation costs on 3D datasets further make it infeasible to rely on human labor to annotate all real-world classes. Multiple solutions are developed based on open vocabulary detection in the two-dimensional (2D) scene. Recently, vision-language (VL) foundation models trained on billions of web-crawled image data with semantic-rich captions are capable of learning adequate vision-language embeddings to connect the text and image, which are further leveraged to solve many 2D open vocabulary tasks including object detection, semantic segmentation, visual question answering and etc. Albeit significantly advancing open vocabulary image understanding tasks, this pre-training paradigm is not directly viable in the 3D domain due to the absence of large-scale 3D data and text pairs.

Further, some initial solutions have attempted to project 3D data into 2D modality (i.e., RGB images and depth maps) such that pre-trained VL foundation models can be leveraged to process the 2D data and achieve object level open vocabulary recognition. Nevertheless, these methods suffer from several major issues, making it suboptimal to handle scene-level understanding tasks (e.g., instance segmentation). First, multiple RGB images and depth maps are required to represent a 3D object, which incurs heavy computation and memory costs during both training and inference. Second, the projection from 3D to 2D induces information loss and prohibits learning from rich 3D data directly, and then leads to poor performance. Therefore, how to detect the open vocabulary objects in a 3D scene in an effective way becomes a hot focus.

Figure 2:
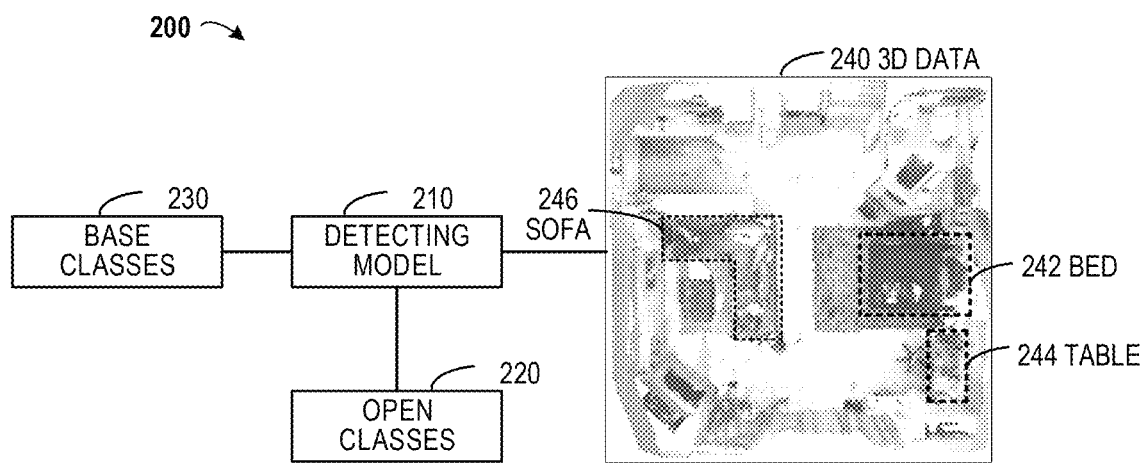
FIG. 2 illustrates an example diagram for detecting an object in a 3D scene based on an open vocabulary according to implementations of the present disclosure.

Based on the above, there is provided a method for detecting an object in a 3D scene, here the object belongs to a class defined in an open vocabulary, but not be limited to the close vocabulary for the annotated data. Referring to FIG. 2 for a brief description of the proposed method, here FIG. 2 illustrates an example diagram 200 for detecting an object in a 3D scene based on an open vocabulary according to implementations of the present disclosure. In FIG. 2, a detecting model 230 may be obtained and the detecting model here describes an association relationship between a plurality of base classes 230 of a plurality of objects and 3D data of the plurality of objects. In other words, the detecting model 210 has the knowledges of the annotated data for the base classes from the training data. In a simple example, the plurality of base classes 230 may include: a bed and a table.

Further, a plurality of open classes 220 of a plurality of candidate objects that are to be detected in a 3D scene may be received. Here, the plurality of open classes 220 may relate to an open vocabulary, and the open vocabulary comprises the plurality of base classes and at least one novel class that is not comprised in the plurality of base classes. For example, the open classes 220 may include: a bed, a table, and a sofa (i.e., the novel class). Then, a 3D portion may be detected in 3D data 240 of the 3D scene based on the detecting model 210 and the plurality of open classes 220, the 3D portion here corresponds to a target candidate object in the plurality of candidate objects, and a class of the target candidate object is comprised in the plurality of open classes.

As shown in FIG. 2, although the training data for the detecting model 210 only includes annotated data relating to the base classes 230, the detecting model 210 may learn more knowledge about other classes that are not annotated in the training data by using with the open classes 220. Therefore, the detecting model 210 may correctly detect more objects with more classes in the 3D data 240. For example, a bed 242 and a table 244 which belong to the base classes 230 may be detected, further a novel sofa 246 which is not mentioned in the base classes 230 may also be detected. With implementations of the proposed solution, the detecting model 210 may learn knowledges based on the annotated training data relating to the base classes. Meanwhile, based on the open classes 220, the detecting model 210 may further learn knowledges about the novel class from other portions in the training data. Therefore, the detecting model 210 may detect objects belonging to either of the base classes and the novel classes.

In contexts of the present disclosure, 3D open vocabulary scene processing aims to recognize and localize novel class without corresponding human annotation as supervision. The 3D data may be represented in the point cloud format. Usually, annotation on semantic and instance level $\mathcal{Y}=\{y^{sem}, y^{ins}\}$ may be divided into base classes $\mathcal{C}^B$ and novel classes $\mathcal{C}^N$. In the training procedure, the 3D data may relate to all the point clouds $\mathcal{P}=\{p\}$ but has only annotations for base classes $\mathcal{Y}^B$, unaware of both annotation $\mathcal{Y}^N$ and class name about novel classes $\mathcal{C}^N$. However, during the inference procedure, the 3D data needs to localize objects and classify points that belong to both base classes and novel classes (i.e., $\mathcal{C}^B \cup \mathcal{C}^N$).

As for a typical 3D scene processing model, it includes a 3D encoder $F^{3D}$, a dense semantic classification head $F_{sem}$ and an instance localization head $F_{loc}$. Its inference pipeline may be demonstrated below:

$$f^p = F_{3D}(p), s = \sigma \cdot F_{sem}(f^p), z = F_{loc}(f^p, s) \qquad \text{Formula 1}$$

In this formula, p represents the input 3D data (i.e., the point cloud), $f^p$ represents a point-wise visual feature, s represents a semantic score for the detected object, z represents an instance proposal output (such as a 3D mask in the point cloud), and σ represents the softmax function. With the above network predictions based on Formula 1, a semantic classification loss $\mathcal{L}_{sem}$ may be determined for the semantic annotation $y^{sem}$, and a localization loss $\mathcal{L}_{loc}$ may be determined for the instance annotation $y^{ins}$. Here, $y^{sem}$ and $y^{ins}$ only relate to base classes $\mathcal{C}^B$ during the training procedure.

$$\mathcal{L}_{sem} = \text{Loss}(s, y^{sem}), \mathcal{L}_{loc} = \text{Loss}(z, y^{ins}) \qquad \text{Formula 2}$$

A detecting model trained with loss functions in Formula 2 may be a close vocabulary model with a close vocabulary classifier $F_{sem}$, incapable of recognizing unknown classes. In this regard, a text-embedded semantic classifier is introduced to obtain an open vocabulary model. Further, a binary calibration module is added to correct the bias toward base classes for open vocabulary inference.

Figure 3:
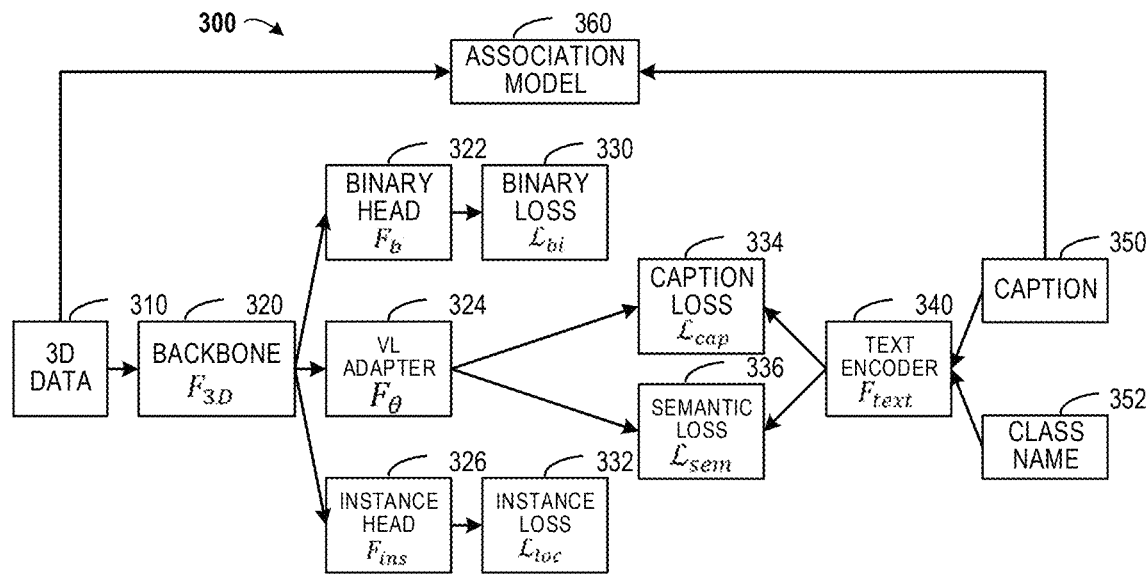
FIG. 3 illustrates an example diagram for an architecture of a detecting model according to implementations of the present disclosure.

Referring to FIG. 3 for a brief description of the language-driven 3D scene detecting model 210, FIG. 3 illustrates an example diagram 300 for an architecture of a detecting model 210 according to implementations of the present disclosure. As shown in FIG. 3, the 3D data 310 may be inputted into a backbone 320 (represented as $F_{3D}$). In the proposed paradigm, the learnable semantic head is replaced by class embeddings encoded by a text encoder 340 from the class name 352 and a caption 350. A binary head 322 is added to rectify semantic scores with base and novel probability as condition. An instance head 326 is tailored to instance segmentation. Most importantly, to endow the model with rich semantic space to improve open vocabulary capability, 3D data embeddings are supervised with caption embeddings based on 3D data-text association by the association model 360. Here, the detecting model 210 may be optimized by multiple loss functions such as the binary loss 330, caption loss 334, semantic loss 336, and the instance loss 332.

In implementations of the present disclosure, based on the above Formula 2, the detecting model may be optimized to have an open vocabulary learner. Here, the learnable semantic classifier $F_{sem}$ may be replaced with a class embedding $f^l$ and a learnable vision-language adapter $F_\theta$. Specifically, as the plurality of open classes are represented in a text format, a plurality of language features may be extracted for the plurality of open classes respectively. Then, a 3D feature may be obtained for the 3D data based on a 3D feature model comprised in the detecting model 210, here the 3D feature model describes an association relationship between reference 3D data and a reference 3D feature for the reference 3D data. Next, the 3D portion in the 3D data may be identified based on a similarity between the plurality of language features and the 3D feature.

In implementations of the present disclosure, the learnable semantic classifier $F_{sem}$ is replaced with class embeddings $f^l$ and a learnable vision-language adapter Fe to match the dimension between 3D features $f^p$ and $f^l$ as follows:

$$f^{p'}=F_\theta(f^p), s=\sigma(f^l \cdot f^{p'}) \quad \text{Formula 3}$$

In this formula, $f^{p'}$ represents the projected features with the VL adapter $F_\theta$, $f^l=[f_1^l, f_2^l, \ldots, f_k^l]$ represents a series of class embeddings obtained by encoding class names $\mathcal{C}$ with a frozen text encoder $F_{text}$ (such as text encoders based on the BERT or CLIP solution). The prediction is made by calculating the cosine similarity among projected point features $f^{p'}$ and classes $f^l$ and then selecting the most similar class. Here, $f^l$ only contains embeddings belonging to the base classes $\mathcal{C}^B$ during the training procedure, but embeddings related to both base and novel classes $\mathcal{C}^B \cup \mathcal{C}^N$ are used during open vocabulary inference procedure. With class embeddings $f^l$ as a classifier, the detecting model 210 may support open vocabulary inference with any desired classes.

With the above implementation, the detecting model 210 already has the capability to processing the objects belonging to the novel classes, and thus performance of the detecting model 210 is increased. As the detecting model 210 is only trained to recognize base classes with the annotated data, it inevitably produces over-confident predictions on base classes regardless of their correctness, also known as the calibration problem. To this end, the binary head 322 is added to rectify the semantic scores with the probability of a point in the 3D data belonging to the base or novel classes.

In implementations of the present disclosure, the binary loss that describes whether a unit (for example, a point) in the 3D data is associated with the plurality of base classes (or the novel class), and then the loss function may be updated based on the binary loss. Specifically, as shown in FIG. 3, the binary head $F_b$ is employed to distinguish annotated units in the 3D data (i.e., points related to objects belonging to the base classes $\mathcal{C}^B$) and unannotated units in the 3D data (i.e., points related to objects belonging to the novel classes $\mathcal{C}^N$). During the training procedure, $F_b$ may be optimized based on the following binary loss function:

$$s^b=F_b(f^p), \mathcal{L}_{bi}=\text{BCELoss}(s^b, y^b) \quad \text{Formula 4}$$

In this formula, BCELoss( ) represents the binary cross-entropy loss, $y^b$ represents the binary label, and $s^b$ represents the predicted binary score (which indicates the probability that whether a point belongs to bass classes). In the inference procedure, the binary probability $s^b$ may be corrected and then the semantic score s may be obtained as follows:

$$s=s_B \cdot (1-s^b)+s_N \cdot s^b \quad \text{Formula 5}$$

In this formula, $s_B$ represents the semantic score computed only on base classes with the score of novel classes being set to zero. Similarly, $s_N$ is computed only on the novel classes with the semantic score of base classes being set to zero. With this implementation of the present disclosure, the probability calibration may largely improve the performance of both base classes and novel classes, and then effectively correct overconfident semantic predictions.

With the text-embedded classifier and the binary semantic calibration module, the detecting model 210 becomes a deep model with the open vocabulary capability. In implementations of the present disclosure, in order to training the detecting model, a reference class may be obtained from the plurality of open classes, and reference 3D data corresponding to a reference object that belongs to the reference class may be obtained from the 3D scene data. In other words, the reference 3D data (i.e., 3D data) and the reference class (i.e., text of the name of the reference) should be associated together before the training. Here, the reference class may relate to a base class. At this point, the reference 3D data corresponding to a reference object that belongs to the reference class may be directly obtained from the annotated portion in the training data, and then the detecting model may be trained based on the reference class and the reference 3D data.

Alternatively, the reference class may relate to a novel class, while the training data does not include annotated data for the novel class. Recent success of open vocabulary works in 2D vision community shows that the effectiveness of introducing language supervision may guide vision backbones. Here, language supervision can not only enable the vision backbone to access abundant semantic concepts with a large vocabulary size but also assist in mapping vision and language features into a common space to facilitate multi-modality downstream tasks. However, Internet-scale paired 3D data-text are not as readily available as image-text pairs on social media, which largely hinders the development of language-driven 3D understanding. In implementations of the present disclosure, an association model 360 is proposed for associating the open classes and the 3D data via image (s). At this point, the reference 3D data corresponding to a reference object that belongs to the novel class may be extracted from the 3D data via the images related to the 3D scene as a bridge. In other words, the image may work as the bridge for associating the 3D data and the names of the novel classes.

Due to the reliable image captioning solution, captions may be correctly extracted from images and then various classes of object may be detected from the images. Further, due to a mapping may be generated between the images and the 3D data (for example, via a depth information of the image, and/or a 3D scanning solution), the images may work as the bridge between the open classes and the 3D data, therefore alleviating the problem of lacking annotated 3D training data. At this point, 3D data (referred to as the reference 3D scene data) for a reference 3D scene may be obtained, here the reference 3D scene relates to at least one reference image. In the indoor environment, multiple reference images may be collected together with the depth information. Then the reference 3D scene data may be generated according to the multiple reference images and the depth information. Alternatively, in the outdoor environment, the outdoor scene may be scanned by a 3D scanning and imaging device, and then the 3D scene data may be directly generated, and the multiple reference images may be directly collected during the scanning procedure.

Figure 4:
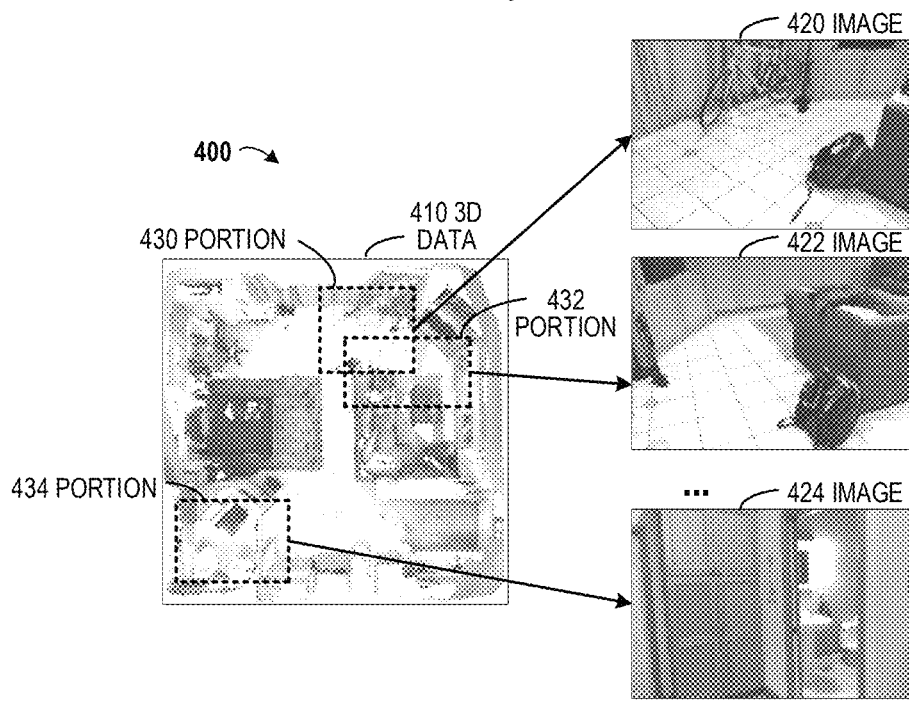
FIG. 4 illustrates an example diagram for an association relationship between 3D data and images according to implementations of the present disclosure.

Regarding to the objects that are not annotated in the training data, the reference 3D data may be selected from the reference 3D scene data via the reference images as the bridge. Referring to FIG. 4 for details about the 3D data and the images, here FIG. 4 illustrates an example diagram 400 for an association relationship between 3D data and images according to implementations of the present disclosure. FIG. 4 illustrates the indoor scene, where images 420, 422, ..., and 424 are collected from different viewpoints in the indoor scene, and then the 3D data 410 is generated based on the images 420, 422, ..., and 424 and depth information related to these images. Here, a portion 430 in the 3D data 410 is generated based on the image 420, a portion 432 is generated based on the image 422, ..., and a portion 434 is generated based on the image 424.

Further, an image-bridged 3D data-text association module is provided for language supervision in 3D scene perception without human annotation. Here, multi-view images of the 3D scene work as a bridge to access knowledge encoded in VL foundation models. Text description is first generated by a powerful image captioning model taking images of 3D scenes as input and is then associated with a set of points in the 3D scene with the projection matrix between images and 3D scenes.

Figure 5:
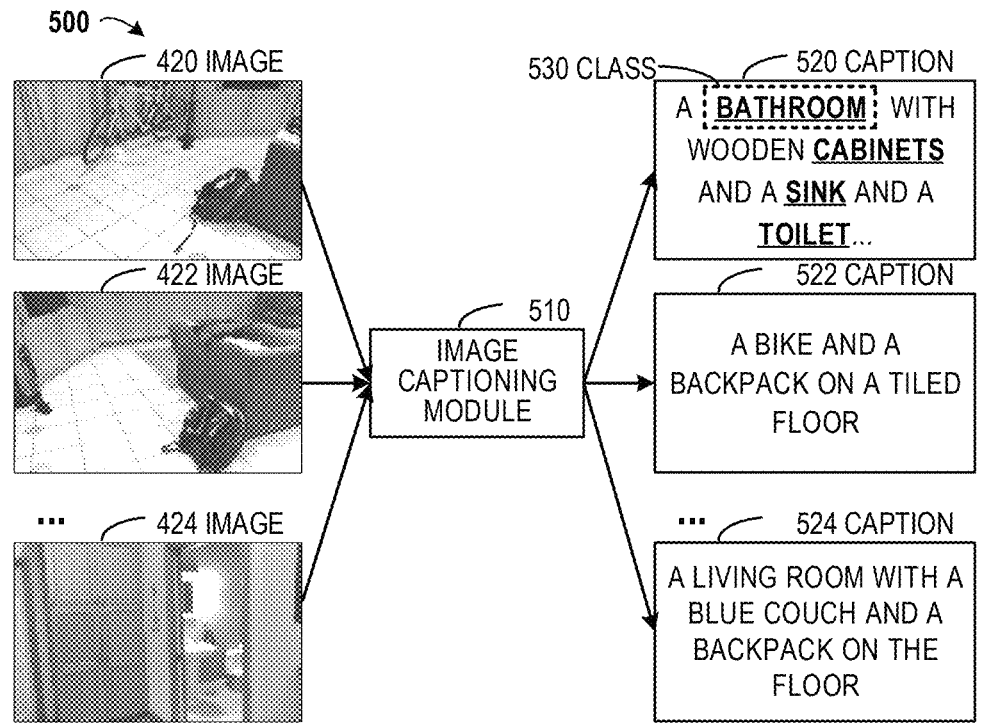
FIG. 5 illustrates an example diagram for extracting classes from images according to implementations of the present disclosure.

In implementations of the present disclosure, the images 420, 422, ..., and 424 may go through an image captioning module (represented as G) for extracting captions from the images and then the captions may be used for determining the classes of the objects in the images. Referring to FIG. 5 for more details, where FIG. 5 illustrates an example diagram 500 for extracting classes from images according to implementations of the present disclosure. In FIG. 5, respective images may be inputted into the image captioning model 510 to get respective captions. For example, the image 420 may be inputted into the image captioning model 510 and the outputted caption 522 may be: "a bathroom with wooden cabinets and a sink and a toilet."

Meanwhile, other images may go through the similar captioning procedure and then a caption 522 "a bike and a backpack on a tiled floor" may be obtained from the image 422, and a caption 524 "a living room with a blue couch and a backpack of the floor" may be obtained from the image 424. As image captioning is a fundamental task in the VL research area, various foundation models have been trained with massive samples are readily available for solving this task. At this point, the present disclosure may make full use of the existing reliable captioning models to identify classes of objects from the reference images. Specifically, supposing the training data includes multiple scenes, and each scene has multiple images, the $j^{th}$ image of the $i^{th}$ scene may be represented as $v_{ij}$, then the pre-trained image captioning module G may generate its corresponding language description:

$$t_{ij}^{v} = \mathcal{G}(v_{ij}) \qquad \text{Formula 6}$$

In this formula, $t_{ij}^{v}$ represents a corresponding language description for the $j^{th}$ image of the $i^{th}$ scene in the training data, and $\mathcal{G}$ represents a pre-trained image captioning module.

Still referring to FIG. 5, words (such as nouns) may be extracted from the captions. Specifically, the word "bathroom" may be extracted and work as a reference class 530. Similarly, other reference classes may be extracted as below: cabinet, sink, and toilet. Further, the reference class related to the image 422 may include a bike, a backpack, and a floor, and the reference class related to the image 424 may include a living room, a couch, a backpack, a floor. At this point, the reference classes may be determined in a reliable and accurate way from the training data.

In implementations of the present disclosure, the training data may be further processed for finding an association between the 3D data and the text (i.e., class names of the object). Given the image-text pairs, the next step is to connect a 3D data p to text t with images v as bridge as follows:

$$\text{Explore} <\hat{p},t> \text{ with } <\hat{p},v> \text{ and } <v,t> \qquad \text{Formula 7}$$

In this formula, $\hat{p}$ represents a portion of the 3D data that corresponds to the text t, v represents an image that includes an object with a class described by the text t. Then Explore represents an operation for finding the 3D data $\hat{p}$ in the 3D scene data p with a constrain that the 3D data p includes point clouds that correspond to an object with a class described by the text t. For example, if the text t relates to "bed," then $\hat{p}$ represents point clouds in the 3D data 410 corresponding to the bed object.

In implementations of the present disclosure, the associations between the 3D data and the text may be managed in different spatial levels. Returning back to FIG. 4, the 3D data 410 of the scene may be managed in a scene level, i.e., 3D data 410 may work as a whole indoor scene, and thus the association may be built between the whole 3D data 410 and all the classes of objects included in the indoor scene. Here, the scene-level association may work as a simple and coarse association manner, to link language supervision to all points in the whole 3D scene data. Specifically, all the image captions $t_{ij}^{v}$ of a given scene $p_j$ may be converted into a scene-level caption $t_j^s$ via a text summarizer $\mathcal{G}_{sum}$ as follows:

$$t_j^s = \mathcal{G}_{sum}(\{t_{1j}^{v}, t_{2j}^{v}, \ldots, t_{nj}^{v}\}) \qquad \text{Formula 8}$$

Figure 6:
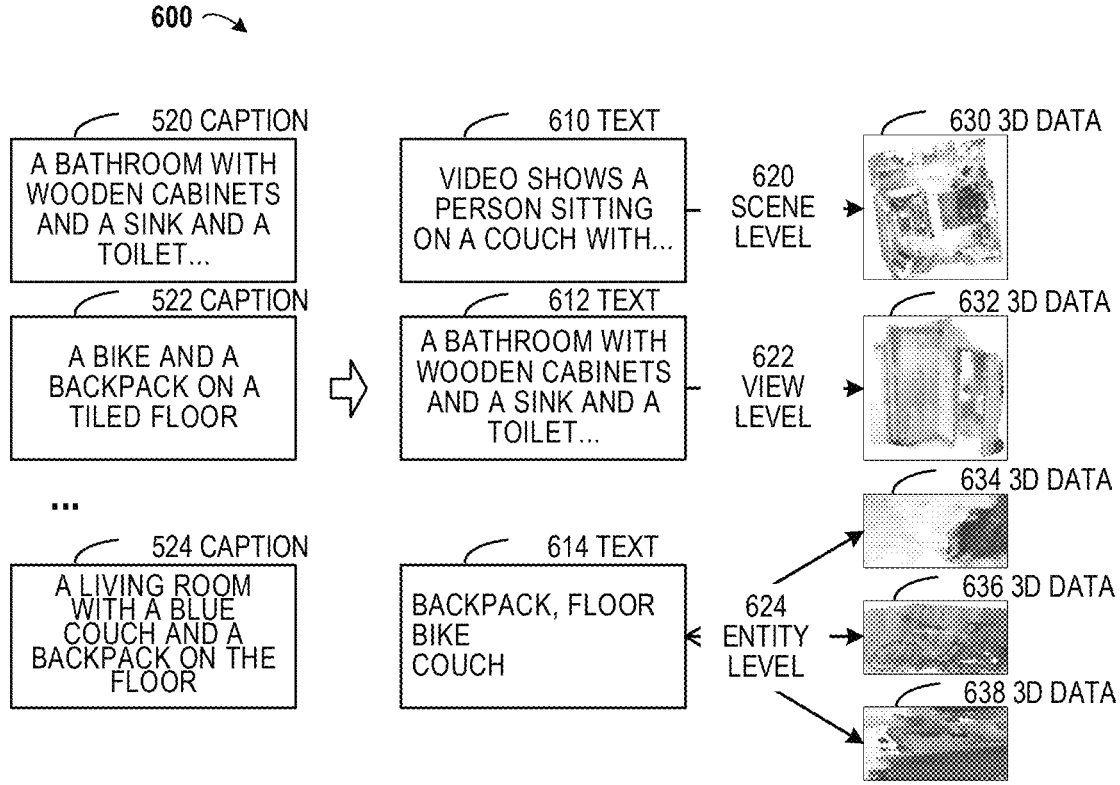
FIG. 6 illustrates an example diagram for obtaining 3D data associated with text according to implementations of the present disclosure.

In this formula, $n_j$ represents the number of images for the scene $p_j$. By forcing each scene p to learn from the corresponding scene captions $t^s$, abundant vocabulary and visual-semantic relationships are introduced to improve the language understanding capability of a 3D network. Referring to FIG. 6 for more details about the summarizing procedure, where FIG. 6 illustrates an example diagram 600 for obtaining 3D data associated with texts according to implementations of the present disclosure.

As shown in FIG. 6, all the captions 520, 522, ..., and 524 related to the whole scene may be inputted to the text summarizer $\mathcal{G}_{sum}$, and then a text 610 may be outputted: "the video shows a person sitting on a couch with ..." At this point, an association may be built between the text 610 and the whole 3D data in the scene-level 620 for training the detecting model 210. With the simplicity of scene-level caption, an association may be built between the whole scene and the classes for objects in the scene, therefore the unannotated portions in the training data may be utilized for obtaining knowledges for detecting open classes.

In implementations of the present disclosure, the 3D data-text association may be managed in a view level 622, where the reference 3D data may be selected from the 3D scene data based on a mapping relationship between the at least one reference image and the reference 3D scene data. The above image captioning module 510 may provide a single caption for each image, and the area in the scene that is covered by an image may be called as a view. Thus, a view-level association may be built to leverage the geometrical relationship between image and points. Therefore, each image caption $t^v$ may be assigned with a point set inside the 3D view frustum $\hat{p}^v$ of the given image v. Specifically, to obtain the view-level point set $\hat{p}^v$, the RGB image v may be back-projected to 3D space using the depth information d, so as to get its corresponding point cloud $\ddot{p}$:

$$[\ddot{p}|1] = T^{-1}[v|d] \qquad \text{Formula 9}$$

In this formula, [•|•] represents a block matrix, $T \in \mathbb{R}^{3 \times 4}$ represents the projection matrix comprising of camera intrinsic matrix and rigid transformations obtained by sensor configurations or mature SLAM approaches (i.e., a mapping relationship between the image and the 3D data). As back-projected points $\ddot{p}$ and points in 3D scene p may be only partially overlapped, at this point their overlapped regions may be determined based on the following formula to get the view-level point set $\hat{p}^v$ as follows, $$\hat{p}^v = V^{-1}(R(V(\ddot{p}), V(p))) \qquad \text{Formula 10}$$

In this formula, $\hat{p}^v$ represents the point set related to the scene, V and $V^{-1}$ are the voxelization and reverse voxelization processes, and R denotes the radius-based nearest-neighbor search. Referring to FIG. 6, the text 612 represents a text related to the view level 622, and 3D data 632 (which relates to the bathroom in the indoor scene) may be obtained from the 3D data 410. At this point, a view-level association may be built between the 3D data 632 and the text 612, therefore the unannotated portions in the training data may be utilized in a finer way for obtaining knowledges for detecting novel classes. Such a view-level association enables the model to learn with region-level text description, which may largely strengthen the model's recognition and localization ability on novel classes.

In implementations of the present disclosure, 3D data may be extracted from the 3D scene data for each image based on a corresponding mapping relationship, and thus the 3D data for multiple images may be compared for providing an entity-level association between the 3D data and text. Here, the entity-level association may provide a fine-grained 3D data-text association that owns the potential to build an entity-level 3D data-text pairs, i.e., the pair may associate an object instance with a caption. The comparison may include any of an interaction and a difference between adjacent view-level point sets $\hat{p}^v$ and their corresponding image caption $t^v$ to obtain the entity-level associated points $\hat{p}^e$ and caption $t^e$. The entity-level caption $t^e$ may be determined as below:

$$w_i = E(t_i^v) \qquad \text{Formula 11}$$

$$w_{i\backslash j}^e = w_i \backslash w_j, w_{j\backslash i}^e = w_j \backslash w_i, w_{i\cap j}^e = w_i \cap w_j \qquad \text{Formula 12}$$

$$t^e = \text{Concate}(w^e) \qquad \text{Formula 13}$$

In the above formulas, E represents an operation for extracting a set of entity words w from caption $t^v$, \ represents a difference operation, ∩ represents an intersection operation, and Concate represents the concatenation of all words with spaces to form an entity-level caption $t^e$. Similarly, the entity-level 3D data may be determined in a similar way based on a comparison of corresponding 3D data for the adjacent views based on a Formula 14. Then, 3D data may be associated with the previously obtained entity-level texts to form point-text pairs as shown in Formula 15.

$$\hat{p}_{i\backslash j}^e = (\hat{p}_i^v \backslash \hat{p}_j^v), \hat{p}_{j\backslash i}^e = (\hat{p}_j^v \backslash \hat{p}_i^v), \hat{p}_{i\cap j}^e = (\hat{p}_i^v \cap \hat{p}_j^v) \qquad \text{Formula 14}$$

$$<\hat{p}_{i\backslash j}^e, t_{i\backslash j}^e>, <\hat{p}_{j\backslash i}^e, t_{j\backslash i}^e>, <\hat{p}_{i\cap j}^e, t_{i\cap j}^e> \qquad \text{Formula 15}$$

In the above formula, $<\hat{p}_{i\backslash j}^e, t_{i\backslash j}^e>$ represents a point-text pair that is obtained from a difference between the $i^{th}$ view and the $j^{th}$ view, $<\hat{p}_{j\backslash i}^e, t_{j\backslash i}^e>$ represents a point-text pair that is obtained from a difference between the $j^{th}$ view and the $i^{th}$ view, and $<\hat{p}_{i\cap j}^e, t_{i\cap j}^e>$ represents a point-text pair that is obtained from an interaction between the $i^{th}$ view and the $j^{th}$ view. Further, entity-level $<\hat{p}^e, t^e>$ pairs may be filtered to ensure that each view-level points set $\hat{p}^e$ relates to at least one entity and focuses on a small enough 3D space as follows, $$\gamma < |\hat{p}^e| < \delta \cdot \min(|\hat{p}_i^v|, |\hat{p}_j^v|) \text{ and, } |t^e| > 0 \qquad \text{Formula 16}$$

In this formula, γ represents a scalar to define minimal number of points in the 3D data, δ is a ratio to control the maximum size of $|\hat{p}^e|$ and caption $t^e$ is not empty. This constraint helps to focus on a fine-grained 3D space with fewer entities in each caption supervision.

For the entity level 624 in FIG. 6, based on an interaction of the 3D data/captions for the images 420 and 422, the 3D data 634 may be obtained and the associated text include: backpack and floor. Based on a difference between the 3D data/captions for the images 420 and 422, the 3D data 634 may be obtained and the associated text include: bike. Based on a difference between the 3D data/captions for the images 422 and 420, the 3D data 638 may be obtained and the associated text include: couch. With these implementations of the present disclosure, the association may be implemented in a finer level, and thus the detecting model 210 may learn more knowledge about the objects.

The above three levels may provide a coarse-to-fine way for finding associated 3D data and corresponding classes. Specifically, the scene-level association has the simplest implementation and obtains the coarsest correspondence between captions and points; the view-level association provides 3D data-text mapping relation at a finer level, enjoying a larger semantic label space and a more localized point set than scene caption; and the entity-level association owns the most fine-grained correspondence relation, matching each caption to fewer points on average, and thus can further benefit dense prediction and instance localization in downstream tasks. Although the above paragraphs describe the above three levels from a coarse way to a fine way, the above three levels may be implemented in a separated way, or in a combined way without any limitation.

In implementations of the present disclosure, the detecting model 210 may be trained based on the comparative learning between the point set and the text. In other words, a loss function may be defined for the detecting model 210 based on a comparative loss for the reference 3D data and the reference class related to the 3D data-text pairs. The above paragraphs have described three levels for obtaining the 3D data-text pairs $<\hat{p}, t>$, then the 3D data-text pairs $<\hat{p}, t>$ obtained in one or more levels may guide the $F_{3D}$ to learn from vocabulary-rich language supervisions. Here, the contrastive learning may be applied to all kinds of coarse-to-fine 3D data-text pairs in the above three levels. Specifically, caption embeddings $f^t$ may be obtained with a pre-trained text encoder $F_{text}$. As for the associated 3D data $\hat{p}$, its corresponding point-wise features may be selected from adapted features $f^v$ and a global average pooling operation may be performed to obtain its feature vector $f^p$:

$$f^t = F_{text}(t), f^p = \text{Pool}(\hat{p}, f^v) \qquad \text{Formula 17}$$

In this formula, $f^t$ represents an embedding related to the caption that is outputted by a text encoder $F_{text}$, $f^v$ represents a feature that is determined based on Formula 3, Pool represents a pooling operation, $\hat{p}$ and t represent the 3D data and text associated with the 3D data-text pairs <p̂, t>, and $f^{\hat{p}}$ represents a 3D data-text embedding for the contrastive learning. At this point, the contrastive loss may pull corresponding 3D data-text embeddings closer and push away unrelated 3D data-text features:

$$\mathcal{L}_{cap} = -\frac{1}{n_t}\sum_{i=1}^{n_t} \log \frac{\exp(f_i^{\hat{p}} \cdot f_i^t / \tau)}{\sum_{j=1}^{n_t} \exp(f_i^{\hat{p}} \cdot f_j^t / \tau)} \quad \text{Formula 18}$$

In this formula, $\mathcal{L}_{cap}$ represents a contrastive learning loss function related to the 3D data-text association, $n_t$ represents the number of 3D data-text pairs in any given association level (for example, the scene-level, the view-level, and the entity-level), $f_i^{\hat{p}}$ represents the $i^{th}$ embedding related to the 3D data, $f_i^t$ represents the $i^{th}$ embedding related to the language, and t is a learnable temperature to modulate the log its as CLIP. In implementations of the present disclosure, duplicate captions may be removed from the batch to avoid noisy optimization during contrastive learning. With Formulas 17 and 18, the final contrastive learning loss function may be determined as:

$$\mathcal{L}_{cap}^{all} = \alpha_1 * \mathcal{L}_{cap}^s + \alpha_2 * \mathcal{L}_{cap}^v + \alpha_2 * \mathcal{L}_{cap}^e \quad \text{Formula 19}$$

In this formula, $\mathcal{L}_{cap}^{all}$ represents the final contrastive learning loss function, $\alpha_1$, $\alpha_2$ and $\alpha_2$ represent different weighs for the above three levels, $\mathcal{L}_{cap}^s$ represents the loss function determined based on Formula 18 in the scene-level, $\mathcal{L}_{cap}^v$ represents the loss function determined based on Formula 18 in the view-level, and $\mathcal{L}_{cap}^e$ represents the loss function determined based on Formula 18 in the entity-level. Based on the above, the overall training objective can be written as:

$$\mathcal{L} = \mathcal{L}_{sem} + \mathcal{L}_{loc} + \mathcal{L}_{cap}^{all} + \mathcal{L}_{bi} \quad \text{Formula 20}$$

In this formula, $\mathcal{L}$ represents an overall loss function for the detecting model 210; $\mathcal{L}_{sem}$ represents a loss function related to the semantic meaning of the object, which may be determined from a difference between the estimated semantic meaning and the annotated semantic meaning; $\mathcal{L}_{loc}$ represents a loss function related to the 3D mask of the object, which may be determined from a difference between the estimated mask and the annotated mask; $\mathcal{L}_{cap}^{all}$ represents the final contrastive learning loss function determined from Formula 19, and $\mathcal{L}_{bi}$ represents a binary loss function determined by Formula 4.

With these implementations of the present disclosure, various aspects may be considered in the training data (including the annotated data and the unannotated data), therefore the performance of the detecting model 210 may be increased. Further, due to the final loss function has the knowledge of the open vocabulary classes (including both of the base classes and the novel classes), the detecting model 210 may detect objects that belong to the open classes accurately.

In implementations of the present disclosure, the detecting model 210 may be used for implementing various downstream tasks. FIG. 7 illustrates an example diagram 700 for a comparison between multiple detecting results according to implementations of the present disclosure. A table 710 in FIG. 7 shows a situation where the detecting model 210 is adopted in the 3D semantic segmentation. The first column represents multiple methods that are to be compared, the second column represents whether the novel classes need to be known during training, the third and fourth columns show various measurements related to two data sets (ScanNet and S3DIS). The table 710 shows that the proposed solution may achieve better improvements than the existing solutions such as LSeg-3D, 3DGenZ, 3DTZSL and the like.

FIG. 8 illustrates an example diagram 800 for a comparison between multiple detecting results according to implementations of the present disclosure. In FIG. 8, a table 810 shows a situation where the detecting model 210 is adopted in the 3D instance segmentation. The measurements in the table 810 also shows that the proposed implementations of the present disclosure achieve better accurate levels. FIG. 9 illustrates an example diagram 900 for a comparison between multiple detecting results according to implementations of the present disclosure. In FIG. 9, a table 910 shows the zero-shot domain transfer results for semantic segmentation and instance segmentation on ScanNet→S3DIS. FIG. 10 illustrates an example diagram 1000 for a comparison between multiple detecting results according to implementations of the present disclosure. In FIG. 10, a table 1010 shows measurements related to the component analysis, and different accurate levels may be achieved based on selected components (for example, the binary loss function, and the constructive loss functions related to the three levels).

Figure 11:
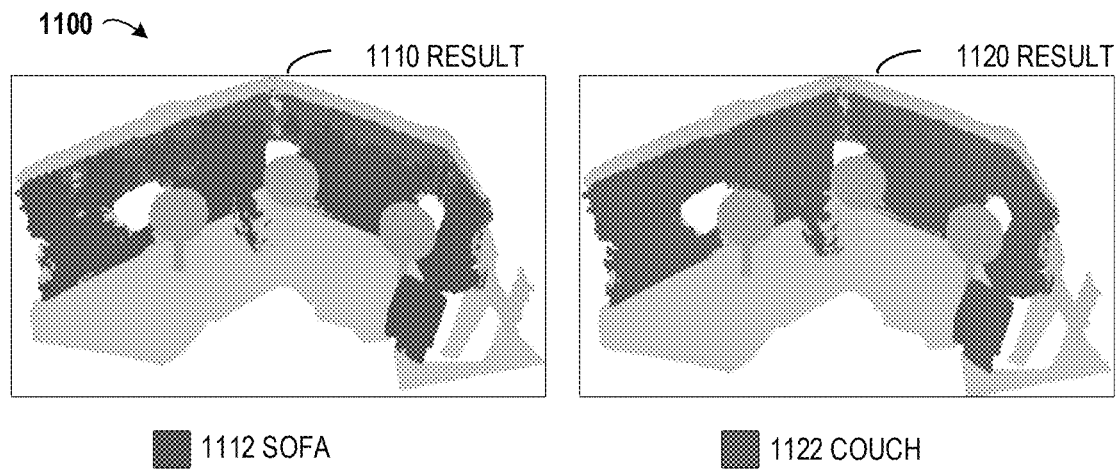
FIG. 11 illustrates an example diagram for multiple detecting results by detecting an object of a synonymic novel class according to implementations of the present disclosure.
Figure 12:
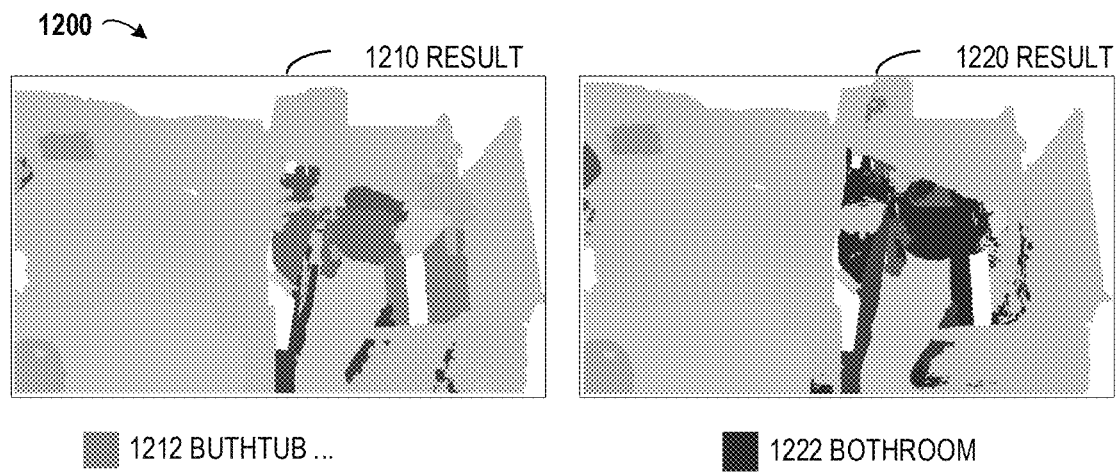
FIG. 12 illustrates an example diagram for multiple detecting results by detecting an object of an abstract novel class according to implementations of the present disclosure.
Figure 13:
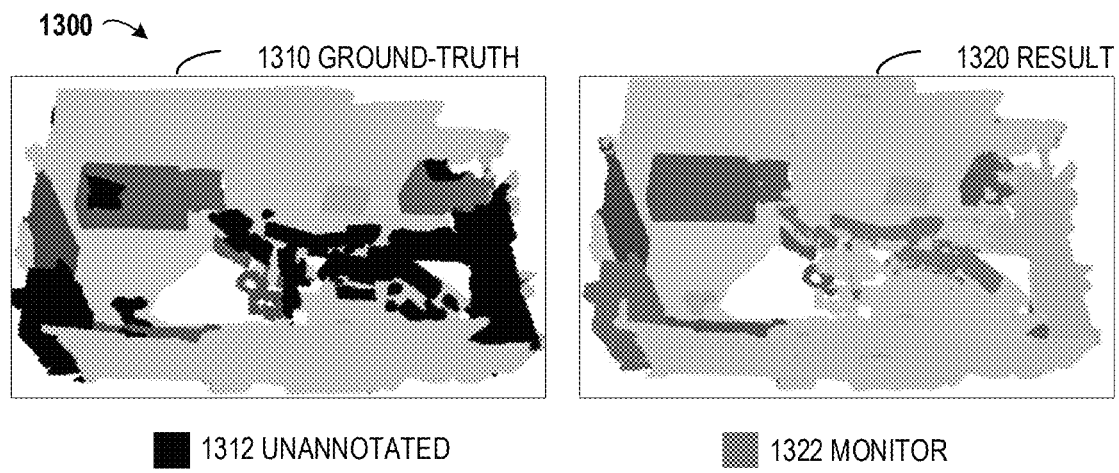
FIG. 13 illustrates an example diagram for multiple detecting results by detecting an object of an unannotated novel class according to implementations of the present disclosure.

FIG. 11 illustrates an example diagram 1110 for multiple detecting results by detecting an object of a synonymic novel class according to implementations of the present disclosure. In this implementation, the class of "sofa" is replaced with the class of "couch," and the result 1110 and the result 1120 show that the object may be correctly detected when either of the classes are used. In FIG. 11, both areas indicated by the colors (the sofa 1112 and couch 1122) are similar and relate to the same object. FIG. 12 illustrates an example diagram 1200 for multiple detecting results by detecting an object of an abstract novel class according to implementations of the present disclosure. In this implementation, multiple classes such as "shower curtain," "toilet," "sink" and "bathtub" are removed from the open classes and a class "bathroom" is added. By a comparison between the results 1210 and 1220, the predicted bathroom 1222 roughly covers the real bathroom area including the bathtub 1212 and other objects. FIG. 13 illustrates an example diagram 1300 for multiple detecting results by detecting an object of an unannotated novel class according to implementations of the present disclosure. In FIG. 13, the color 1312 in the ground-truth 1310 indicates the unannotated objects, and the result 1320 shows that the monitor 1322 is detected by the detecting model.

Based on the above, the present disclosure proposes a general and effective language-driven 3D scene understanding framework that enable the 3D model to localize and recognize novel classes. By leveraging images as bridge, hierarchical 3D data-text pairs may be built based on the powerful 2D VL foundation models and geometric constraints between 3D scenes and 2D images. Further, the contrastive learning is utilized for pulling features of such associated pairs closer, introducing rich semantic concepts into the 3D network. Extensive experimental results show the proposed solutions implement open vocabulary semantic and instance segmentation in a more accurate and effective way.

The above paragraphs have described details for detecting an object in a 3D scene. According to implementations of the present disclosure, a method is provided for detecting an object in a 3D scene. Reference will be made to FIG. 14 for more details about the method, here FIG. 14 illustrates an example flowchart of a method 1400 for detecting an object in a 3D scene based on an open vocabulary according to implementations of the present disclosure. At a block 1410, a detecting model is obtained, here the detecting model describes an association relationship between a plurality of base classes of a plurality of objects and 3D data of the plurality of objects. At a block 1420, a plurality of open classes of a plurality of candidate objects are that are to be detected in a 3D scene are received, here the plurality of open classes comprises the plurality of base classes and at least one novel class that is not comprised in the plurality of base classes. At a block 1430, a 3D portion is detected in 3D data of the 3D scene, and the 3D portion here corresponds to a target candidate object in the plurality of candidate objects based on the detecting model and the plurality of open classes, a class of the target candidate object being comprised in the plurality of open classes.

In implementations of the present disclosure, detecting the 3D portion comprises: extracting a plurality of language features for the plurality of open classes respectively, the plurality of open classes being represented in a text format; obtaining a 3D feature for the 3D data based on a 3D feature model comprised in the detecting model, the 3D feature model describing an association relationship between reference 3D data and a reference 3D feature for the reference 3D data; and identifying the 3D portion in the 3D data based on a similarity between the plurality of language features and the 3D feature.

In implementations of the present disclosure, obtaining the detecting model comprises: acquiring a reference class from the plurality of open classes; obtaining reference 3D data corresponding to a reference object that belongs to the reference class; and training the detecting model based on the reference 3D data and the reference class.

In implementations of the present disclosure, obtaining the reference 3D data comprises: acquiring reference 3D scene data of a reference 3D scene that is defined by at least one reference image; and selecting the reference 3D data from the reference 3D scene data based on a predetermined accuracy level.

In implementations of the present disclosure, acquiring the reference class comprises: obtaining at least one caption for the at least one reference image based on a predefined image captioning model; and determining the reference class based on the at least one caption.

In implementations of the present disclosure, selecting the reference 3D data comprises: in response to a determination that the predetermined accuracy level being a scene level, selecting the reference 3D scene data as the reference 3D data.

In implementations of the present disclosure, selecting the reference 3D data comprises: in response to a determination that the predetermined accuracy level being a view level, selecting the reference 3D data based on a mapping relationship between the at least one reference image and the reference 3D scene data.

In implementations of the present disclosure, the at least one reference image comprises a plurality of reference images, and selecting the reference 3D data comprises: in response to a determination that the predetermined accuracy level being an entity level, selecting first reference 3D data based on a first mapping relationship between the first reference image and the reference 3D scene data, and selecting second reference 3D data based on a second mapping relationship between the second reference image and the reference 3D scene data; and determining the reference 3D data based on a comparison between the first reference 3D data and the second reference 3D data, the comparison comprising any of an interaction and a difference between the first reference 3D data and the second reference 3D data.

In implementations of the present disclosure, acquiring the reference class comprises: determining the reference class based on a comparison of at least one caption for the first reference image and at least one caption for the second reference image.

In implementations of the present disclosure, training the detecting model comprises: determining a loss function for the detecting model based on a comparative loss for the reference 3D data and the reference class.

In implementations of the present disclosure, training the detecting model further comprises: determining a binary loss that indicating whether a 3D point in the 3D data is associated with the plurality of base classes; and updating the loss function based on the binary loss.

According to implementations of the present disclosure, an apparatus is provided for detecting an object in a three-dimensional (3D) scene. The apparatus comprises: an obtaining unit, being configured for obtaining a detecting model describing an association relationship between a plurality of base classes of a plurality of objects and 3D data of the plurality of objects; a receiving unit, being configured for receiving a plurality of open classes of a plurality of candidate objects that are to be detected in a 3D scene, the plurality of open classes comprising the plurality of base classes and at least one novel class that is not comprised in the plurality of base classes; and a detecting unit, being configured for detecting, in 3D data of the 3D scene, a 3D portion that corresponds to a target candidate object in the plurality of candidate objects based on the detecting model and the plurality of open classes, a class of the target candidate object being comprised in the plurality of open classes. Further, the apparatus may comprise other units that are configured for implementing other steps in the above method.

According to implementations of the present disclosure, an electronic device is provided for implementing the above method. The electronic device comprises: a computer processor coupled to a computer-readable memory unit, the memory unit comprising instructions that when executed by the computer processor implements a method for detecting an object in 3D scene. The method comprises: obtaining a detecting model describing an association relationship between a plurality of base classes of a plurality of objects and 3D data of the plurality of objects; receiving a plurality of open classes of a plurality of candidate objects that are to be detected in a 3D scene, the plurality of open classes comprising the plurality of base classes and at least one novel class that is not comprised in the plurality of base classes; and detecting, in 3D data of the 3D scene, a 3D portion that corresponds to a target candidate object in the plurality of candidate objects based on the detecting model and the plurality of open classes, a class of the target candidate object being comprised in the plurality of open classes.

In implementations of the present disclosure, detecting the 3D portion comprises: extracting a plurality of language features for the plurality of open classes respectively, the plurality of open classes being represented in a text format; obtaining a 3D feature for the 3D data based on a 3D feature model comprised in the detecting model, the 3D feature model describing an association relationship between reference 3D data and a reference 3D feature for the reference 3D data; and identifying the 3D portion in the 3D data based on a similarity between the plurality of language features and the 3D feature.

In implementations of the present disclosure, obtaining the detecting model comprises: acquiring a reference class from the plurality of open classes; obtaining reference 3D data corresponding to a reference object that belongs to the reference class; and training the detecting model based on the reference 3D data and the reference class.

In implementations of the present disclosure, obtaining the reference 3D data comprises: acquiring reference 3D scene data of a reference 3D scene that is defined by at least one reference image; and selecting the reference 3D data from the reference 3D scene data based on a predetermined accuracy level.

In implementations of the present disclosure, acquiring the reference class comprises: obtaining at least one caption for the at least one reference image based on a predefined image captioning model; and determining the reference class based on the at least one caption.

In implementations of the present disclosure, selecting the reference 3D data comprises: in response to a determination that the predetermined accuracy level being a scene level, selecting the reference 3D scene data as the reference 3D data.

In implementations of the present disclosure, selecting the reference 3D data comprises: in response to a determination that the predetermined accuracy level being a view level, selecting the reference 3D data based on a mapping relationship between the at least one reference image and the reference 3D scene data.

In implementations of the present disclosure, the at least one reference image comprises a plurality of reference images, and selecting the reference 3D data comprises: in response to a determination that the predetermined accuracy level being an entity level, selecting first reference 3D data based on a first mapping relationship between the first reference image and the reference 3D scene data, and selecting second reference 3D data based on a second mapping relationship between the second reference image and the reference 3D scene data; and determining the reference 3D data based on a comparison between the first reference 3D data and the second reference 3D data, the comparison comprising any of an interaction and a difference between the first reference 3D data and the second reference 3D data.

In implementations of the present disclosure, acquiring the reference class comprises: determining the reference class based on a comparison of at least one caption for the first reference image and at least one caption for the second reference image.

In implementations of the present disclosure, training the detecting model comprises: determining a loss function for the detecting model based on a comparative loss for the reference 3D data and the reference class.

In implementations of the present disclosure, training the detecting model further comprises: determining a binary loss that indicating whether a 3D point in the 3D data is associated with the plurality of base classes; and updating the loss function based on the binary loss.

FIG. 15 illustrates a block diagram of a computing device 1500 in which various implementations of the present disclosure can be implemented. It would be appreciated that the computing device 1500 shown in FIG. 15 is merely for purpose of illustration, without suggesting any limitation to the functions and scopes of the present disclosure in any manner. The computing device 1500 may be used to implement the above method 1500 in implementations of the present disclosure. As shown in FIG. 15, the computing device 1500 may be a general-purpose computing device. The computing device 1500 may at least comprise one or more processors or processing units 1510, a memory 1520, a storage unit 1530, one or more communication units 1540, one or more input devices 1550, and one or more output devices 1560.

The processing unit 1510 may be a physical or virtual processor and can implement various processes based on programs stored in the memory 1520. In a multi-processor system, multiple processing units execute computer executable instructions in parallel so as to improve the parallel processing capability of the computing device 1500. The processing unit 1510 may also be referred to as a central processing unit (CPU), a microprocessor, a controller, or a microcontroller.

The computing device 1500 typically includes various computer storage medium. Such medium can be any medium accessible by the computing device 1500, including, but not limited to, volatile and non-volatile medium, or detachable and non-detachable medium. The memory 1520 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1530 may be any detachable or non-detachable medium and may include a machine-readable medium such as a memory, flash memory drive, magnetic disk, or another other media, which can be used for storing information and/or data and can be accessed in the computing device 1500.

The computing device 1500 may further include additional detachable/non-detachable, volatile/non-volatile memory medium. Although not shown in FIG. 15, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1540 communicates with a further computing device via the communication medium. In addition, the functions of the components in the computing device 1500 can be implemented by a single computing cluster or multiple computing machines that can communicate via communication connections. Therefore, the computing device 1500 can operate in a networked environment using a logical connection with one or more other servers, networked personal computers (PCs) or further general network nodes.

The input device 1550 may be one or more of a variety of input devices, such as a mouse, keyboard, tracking ball, voice-input device, and the like. The output device 1560 may be one or more of a variety of output devices, such as a display, loudspeaker, printer, and the like. By means of the communication unit 1540, the computing device 1500 can further communicate with one or more external devices (not shown) such as the storage devices and display device, with one or more devices enabling the user to interact with the computing device 1500, or any devices (such as a network card, a modem, and the like) enabling the computing device 1500 to communicate with one or more other computing devices, if required. Such communication can be performed via input/output (I/O) interfaces (not shown).

In some implementations, instead of being integrated in a single device, some, or all components of the computing device 1500 may also be arranged in cloud computing architecture. In the cloud computing architecture, the components may be provided remotely and work together to implement the functionalities described in the present disclosure. In some implementations, cloud computing provides computing, software, data access and storage service, which will not require end users to be aware of the physical locations or configurations of the systems or hardware providing these services. In various implementations, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are illustrated in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

From the foregoing, it will be appreciated that specific implementations of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media, and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any disclosure or of what may be claimed, but rather as descriptions of features that may be specific to particular implementations of particular disclosures. Certain features that are described in the present disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are illustrated in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations. Only a few implementations and examples are described and other implementations, enhancements and variations can be made based on what is described and illustrated in the present disclosure.

What is claimed is:

1. A method for detecting an object in a three-dimensional (3D) scene, comprising:
   obtaining a detecting model describing an association relationship between a plurality of base classes of a plurality of objects and 3D data of the plurality of objects;
   receiving a plurality of open classes of a plurality of candidate objects that are to be detected in a 3D scene, wherein the plurality of open classes comprising the plurality of base classes and at least one novel class that is not comprised in the plurality of base classes; and
   detecting, in 3D data of the 3D scene, a 3D portion that corresponds to a target candidate object in the plurality of candidate objects based on the detecting model and the plurality of open classes, a class of the target candidate object being comprised in the plurality of open classes,
   wherein obtaining the detecting model comprises:
   acquiring a reference class from the plurality of open classes;
   obtaining reference 3D data corresponding to a reference object that belongs to the reference class; and
   training the detecting model based on the reference 3D data and the reference class by determining a loss function for the detecting model based on a comparative loss for the reference 3D data and the reference class.

2. The method according to claim 1, wherein detecting the 3D portion comprises:
   extracting a plurality of language features for the plurality of open classes respectively, the plurality of open classes being represented in a text format;
   obtaining a 3D feature for the 3D data based on a 3D feature model comprised in the detecting model, the 3D feature model describing an association relationship between reference 3D data and a reference 3D feature for the reference 3D data; and
   identifying the 3D portion in the 3D data based on a similarity between the plurality of language features and the 3D feature.

3. The method according to claim 1, wherein obtaining the reference 3D data comprises:
   acquiring reference 3D scene data of a reference 3D scene that is defined by at least one reference image; and
   selecting the reference 3D data from the reference 3D scene data based on a predetermined accuracy level.

4. The method according to claim 3, wherein acquiring the reference class comprises:
   obtaining at least one caption for the at least one reference image based on a predefined image captioning model; and
   determining the reference class based on the at least one caption.

5. The method according to claim 3, wherein selecting the reference 3D data comprises: in response to a determination that the predetermined accuracy level being a scene level, selecting the reference 3D scene data as the reference 3D data.

6. The method according to claim 3, wherein selecting the reference 3D data comprises: in response to a determination that the predetermined accuracy level being a view level, selecting the reference 3D data based on a mapping relationship between the at least one reference image and the reference 3D scene data.

7. The method according to claim 3, wherein the at least one reference image comprises a plurality of reference images, and selecting the reference 3D data comprises: in response to a determination that the predetermined accuracy level being an entity level,
   selecting first reference 3D data based on a first mapping relationship between the first reference image and the reference 3D scene data, and selecting second reference 3D data based on a second mapping relationship between the second reference image and the reference 3D scene data; and determining the reference 3D data based on a comparison between the first reference 3D data and the second reference 3D data, the comparison comprising any of an interaction and a difference between the first reference 3D data and the second reference 3D data.

8. The method according to claim 7, wherein acquiring the reference class comprises: determining the reference class based on a comparison of at least one caption for the first reference image and at least one caption for the second reference image.

9. The method according to claim 1, wherein training the detecting model further comprises:

determining a binary loss that indicating whether a 3D point in the 3D data is associated with the plurality of base classes; and updating the loss function based on the binary loss.

10. The method according to claim 1, wherein:

detecting the 3D portion comprises:

extracting a plurality of language features for the plurality of open classes respectively, the plurality of open classes being represented in a text format;

obtaining a 3D feature for the 3D data based on a 3D feature model comprised in the detecting model, the 3D feature model describing an association relationship between reference 3D data and a reference 3D feature for the reference 3D data; and identifying the 3D portion in the 3D data based on a similarity between the plurality of language features and the 3D feature; and obtaining the reference 3D data comprises:

acquiring reference 3D scene data of a reference 3D scene that is defined by at least one reference image; and selecting the reference 3D data from the reference 3D scene data based on a predetermined accuracy level.

11. An electronic device, comprising a computer processor coupled to a computer-readable memory unit, the memory unit comprising instructions that when executed by the computer processor implements a method for detecting an object in a three-dimensional (3D) scene, the method comprising:

obtaining a detecting model describing an association relationship between a plurality of base classes of a plurality of objects and 3D data of the plurality of objects;

receiving a plurality of open classes of a plurality of candidate objects that are to be detected in a 3D scene, wherein the plurality of open classes comprising the plurality of base classes and at least one novel class that is not comprised in the plurality of base classes; and detecting, in 3D data of the 3D scene, a 3D portion that corresponds to a target candidate object in the plurality of candidate objects based on the detecting model and the plurality of open classes, a class of the target candidate object being comprised in the plurality of open classes, wherein obtaining the detecting model comprises;

determining a reference class;

obtaining reference 3D data corresponding to a reference object that belongs to the reference class; and training the detecting model based on the reference 3D data and the reference class by determining a loss function for the detecting model based on a comparative loss for the reference 3D data and the reference class.

12. The device according to claim 11, wherein detecting the 3D portion comprises:

extracting a plurality of language features for the plurality of open classes respectively, the plurality of open classes being represented in a text format;

obtaining a 3D feature for the 3D data based on a 3D feature model comprised in the detecting model, the 3D feature model describing an association relationship between reference 3D data and a reference 3D feature for the reference 3D data; and identifying the 3D portion in the 3D data based on a similarity between the plurality of language features and the 3D feature.

13. The device according to claim 11, wherein determining the reference class comprises:

determining the reference class based on at least one caption for the at least one reference image determined by a predefined image captioning model.

14. The device according to claim 13, wherein obtaining the reference 3D data comprises:

acquiring reference 3D scene data of a reference 3D scene that is defined by at least one reference image; and selecting the reference 3D data from the reference 3D scene data based on a predetermined accuracy level.

15. The device according to claim 14, wherein selecting the reference 3D data comprises any of:

in response to a determination that the predetermined accuracy level being a scene level, selecting the reference 3D scene data as the reference 3D data;

in response to a determination that the predetermined accuracy level being a view level, selecting the reference 3D data based on a mapping relationship between the at least one reference image and the reference 3D scene data.

16. The device according to claim 14, wherein the at least one reference image comprises a plurality of reference images, and selecting the reference 3D data comprises: in response to a determination that the predetermined accuracy level being an entity level, selecting first reference 3D data based on a first mapping relationship between the first reference image and the reference 3D scene data, and selecting second reference 3D data based on a second mapping relationship between the second reference image and the reference 3D scene data; and determining the reference 3D data based on a comparison between the first reference 3D data and the second reference 3D data, the comparison comprising any of an interaction and a difference between the first reference 3D data and the second reference 3D data.

17. The device according to claim 11, wherein training the detecting model further comprises:

determining a binary loss that indicating whether a 3D point in the 3D data is associated with the plurality of base classes; and updating the loss function based on the binary loss.

18. A computer program product, the computer program product comprising a non-transitory computer readable storage medium having program instructions embodied therewith, the program instructions executable by an electronic device to cause the electronic device to perform a method for detecting an object in a three-dimensional (3D) scene, the method comprising:

obtaining a detecting model describing an association relationship between a plurality of base classes of a plurality of objects and 3D data of the plurality of objects;

receiving a plurality of open classes of a plurality of candidate objects that are to be detected in a 3D scene, wherein the plurality of open classes comprising the plurality of base classes and at least one novel class that is not comprised in the plurality of base classes; and detecting, in 3D data of the 3D scene, a 3D portion that corresponds to a target candidate object in the plurality of candidate objects based on the detecting model and the plurality of open classes, a class of the target candidate object being comprised in the plurality of open classes, wherein obtaining the detecting model comprises:
  acquiring a reference class from the plurality of open classes;
  obtaining reference 3D data corresponding to a reference object that belongs to the reference class; and
  training the detecting model based on the reference 3D data and the reference class by determining a loss function for the detecting model based on a comparative loss for the reference 3D data and the reference class.

* * * * *